(12) United States Patent
Ezoe et al.

(10) Patent No.: US 12,539,066 B2
(45) Date of Patent: Feb. 3, 2026

(54) BIOLOGICAL INFORMATION MEASUREMENT DEVICE, BIOLOGICAL INFORMATION MANAGEMENT SYSTEM, AND CONTROL METHOD OF BIOLOGICAL INFORMATION MEASUREMENT DEVICE

(71) Applicant: OMRON HEALTHCARE Co., Ltd., Kyoto (JP)

(72) Inventors: Mika Ezoe, Kyoto (JP); Mitsuru Samejima, Kyoto (JP); Shinya Kodaka, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 515 days.

(21) Appl. No.: 17/663,605

(22) Filed: May 16, 2022

(65) Prior Publication Data

US 2022/0273221 A1 Sep. 1, 2022

Related U.S. Application Data

(63) Continuation of application No. PCT/JP2020/041468, filed on Nov. 6, 2020.

(30) Foreign Application Priority Data

Nov. 20, 2019 (JP) .................................. 2019-209869

(51) Int. Cl.
*A61B 5/332* (2021.01)
*A61B 5/00* (2006.01)
(Continued)

(52) U.S. Cl.
CPC ............ *A61B 5/332* (2021.01); *A61B 5/0006* (2013.01); *A61B 5/333* (2021.01); *A61B 5/339* (2021.01); *A61B 5/6898* (2013.01)

(58) Field of Classification Search
CPC ....... A61B 5/332; A61B 5/0006; A61B 5/333; A61B 5/339; A61B 5/6898;
(Continued)

(56) References Cited

U.S. PATENT DOCUMENTS 4,350,164 A 9/1982 Allain
10,741,271 B2 * 8/2020 Shiraishi ............... H04W 28/04
(Continued)

FOREIGN PATENT DOCUMENTS

CN 1572240 A 2/2005
CN 109310339 A 2/2019
(Continued)

OTHER PUBLICATIONS

ISR Report for International application No. PCT/JP2020/041468; dated Jan. 19, 2021.
(Continued)

*Primary Examiner* — Jonathan T Kuo
(74) *Attorney, Agent, or Firm* — Colson Law Group, PLLC

(57) ABSTRACT

A biological information measurement device including: a sensor that measures biological information, a storage means that stores the biological information measured by the sensor, a communication means for communicating with another information processing terminal, and a control means that executes a measurement process of the biological information, wherein when the control means executes the measurement process of the biological information, in a case where communication between the biological information measurement device and the other information processing terminal is not established, the control means continuously executes a process for establishing a communication connection with the information processing terminal and executes a process of storing, in the storage means, the
(Continued)

biological information that is measured, and in a case where the communication between the biological information measurement device and the other information processing terminal is established.

7 Claims, 10 Drawing Sheets

(51) Int. Cl.
*A61B 5/333* (2021.01)
*A61B 5/339* (2021.01)

(58) Field of Classification Search
CPC ... A61B 5/30–5/308; A61B 5/318–367; H04B 1/38
See application file for complete search history.

(56) References Cited

U.S. PATENT DOCUMENTS

2004/0122489 A1* 6/2004 Mazar ............... A61N 1/37282
607/60

2008/0211665 A1 9/2008 Mazar et al.
2011/0213620 A1 9/2011 Dziubinski et al.
2018/0166156 A1* 6/2018 Shiraishi ............... G16H 10/40

FOREIGN PATENT DOCUMENTS

| | | |
|---|---|---|
| JP | 2-154740 A | 6/1990 |
| JP | 2005-000420 A | 1/2005 |
| JP | 2005-211388 A | 8/2005 |
| WO | 2015/035251 A1 | 3/2015 |
| WO | 2016/136051 A1 | 9/2016 |

OTHER PUBLICATIONS

Office Action issued on Sep. 7, 2024 in corresponding CN patent application No. 202080073450.7.
Office Action issued on Apr. 2, 2024 in corresponding JP patent application No. 2019-209869.
Office Action issued on May 31, 2025 in corresponding CN patent application No. 202080073450.7.

* cited by examiner

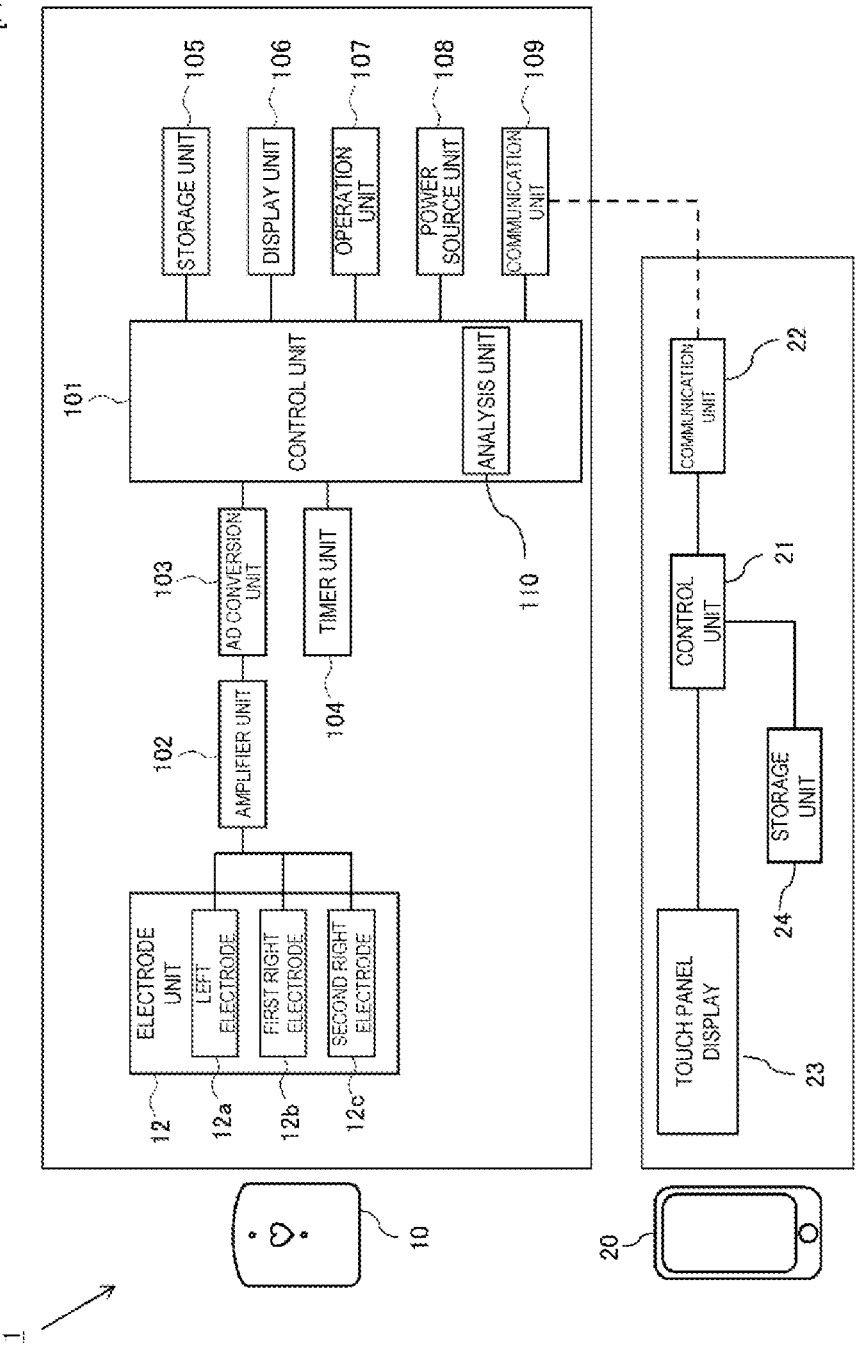

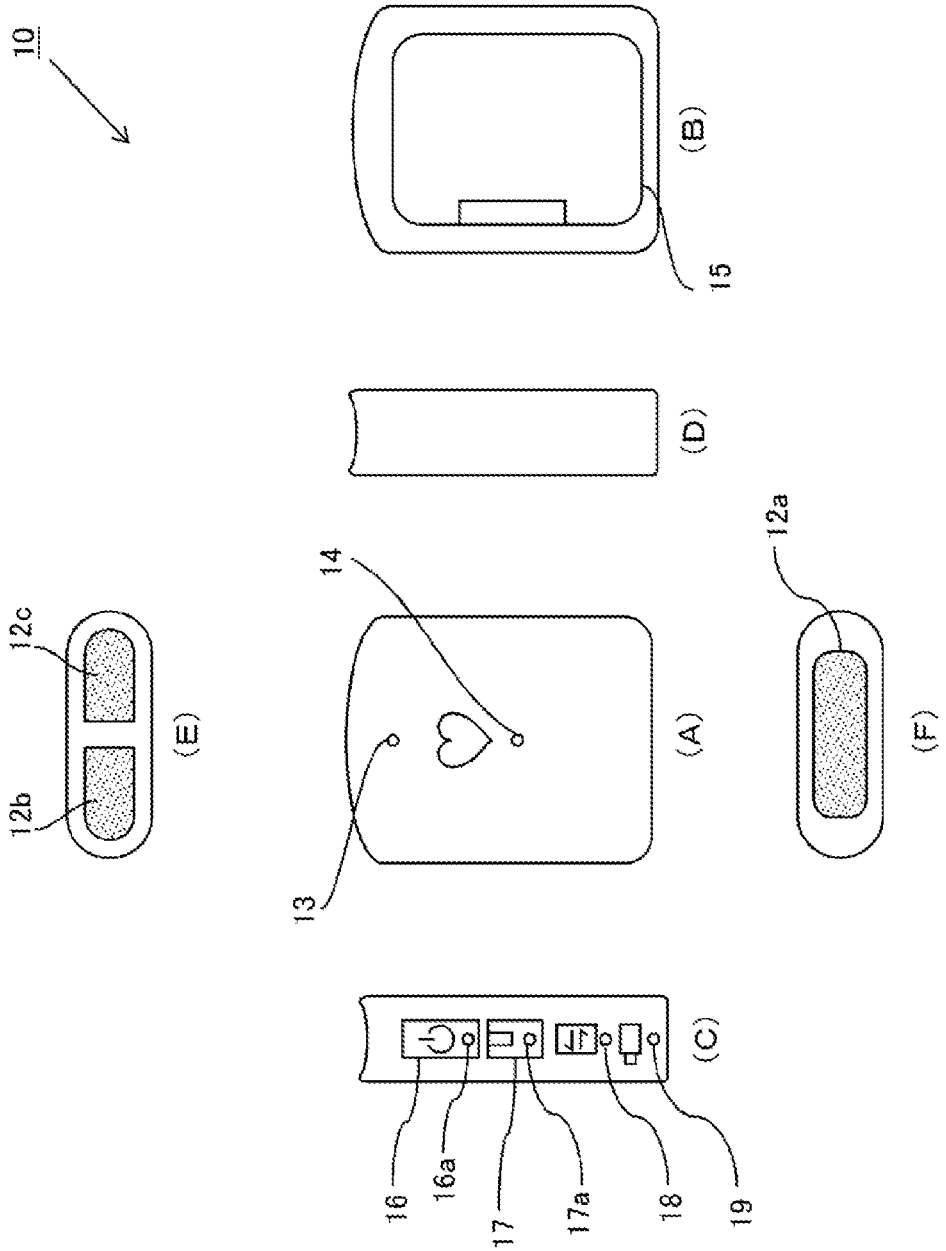

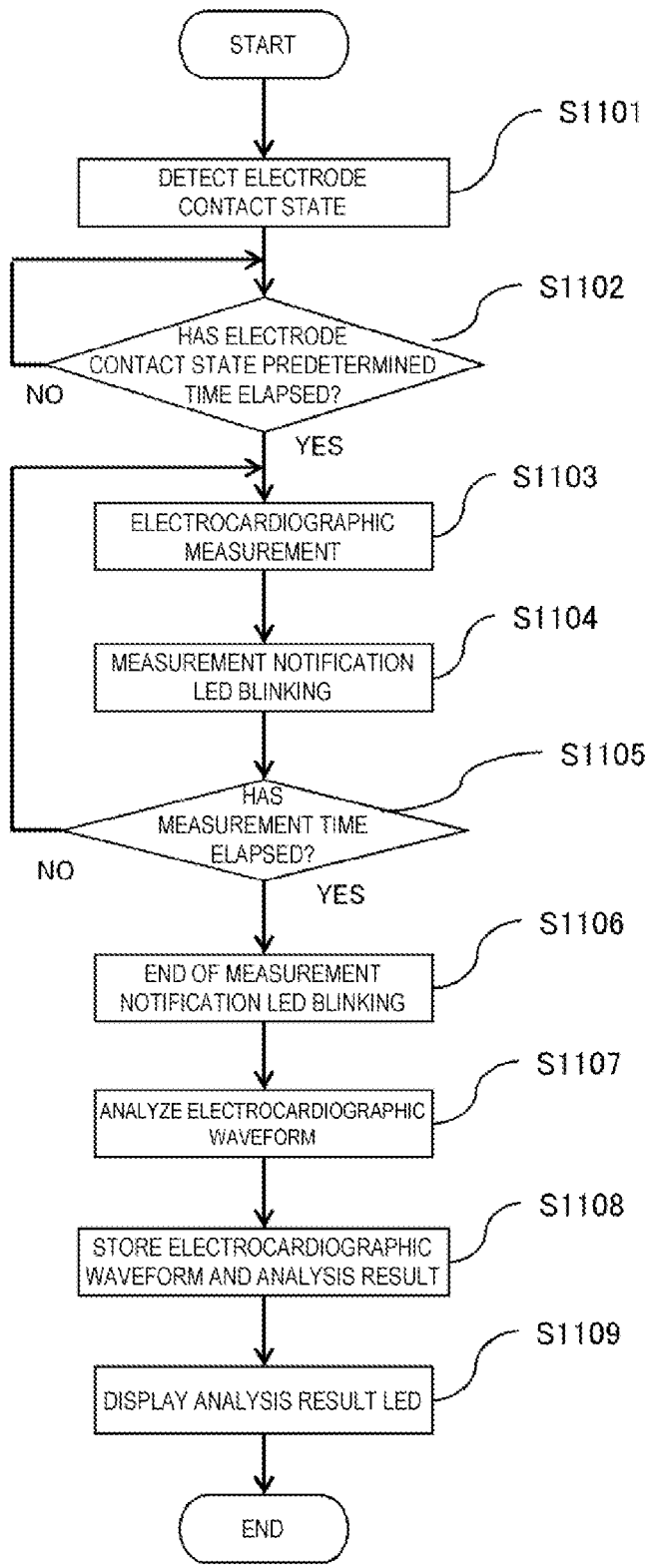

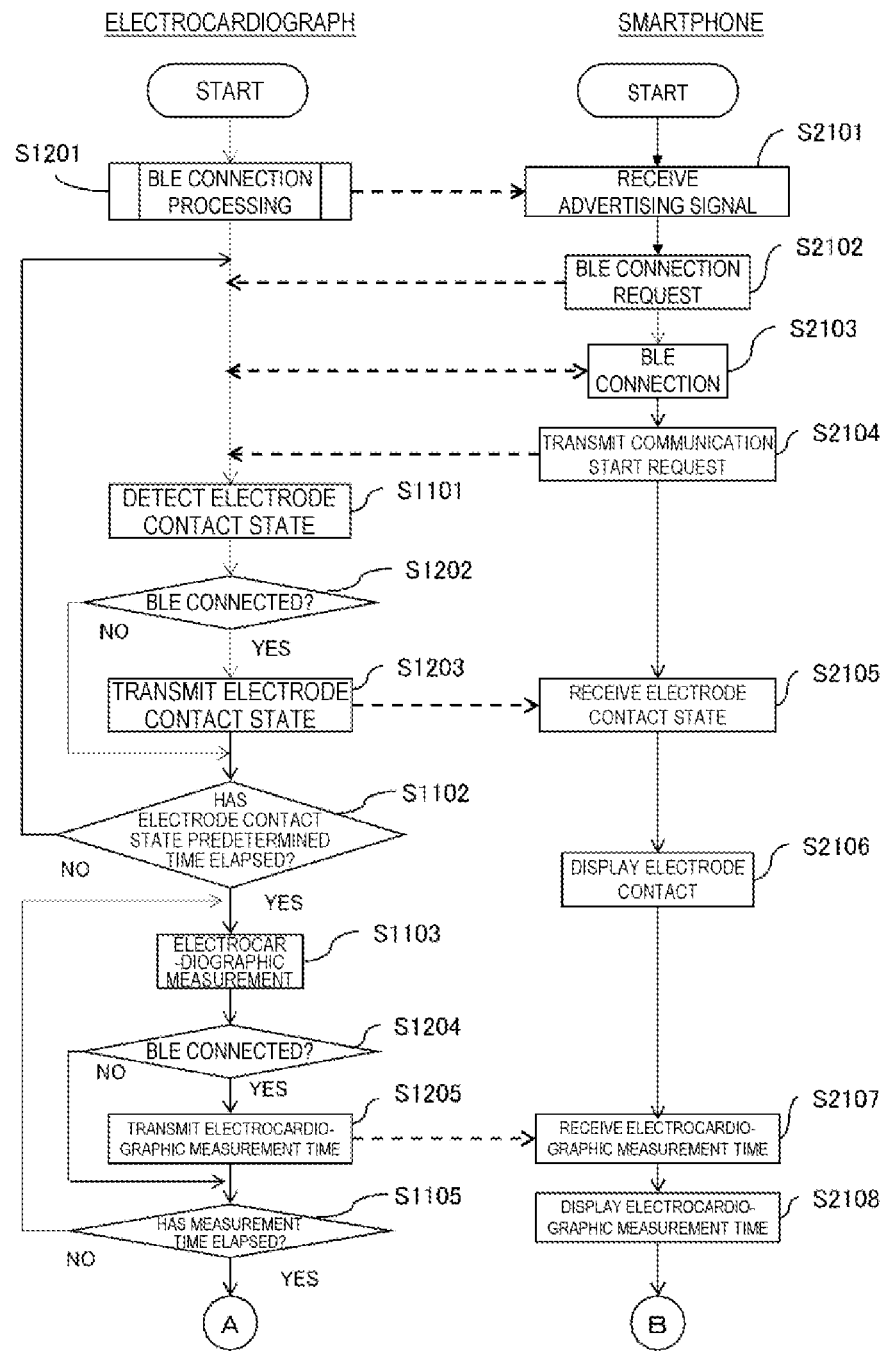

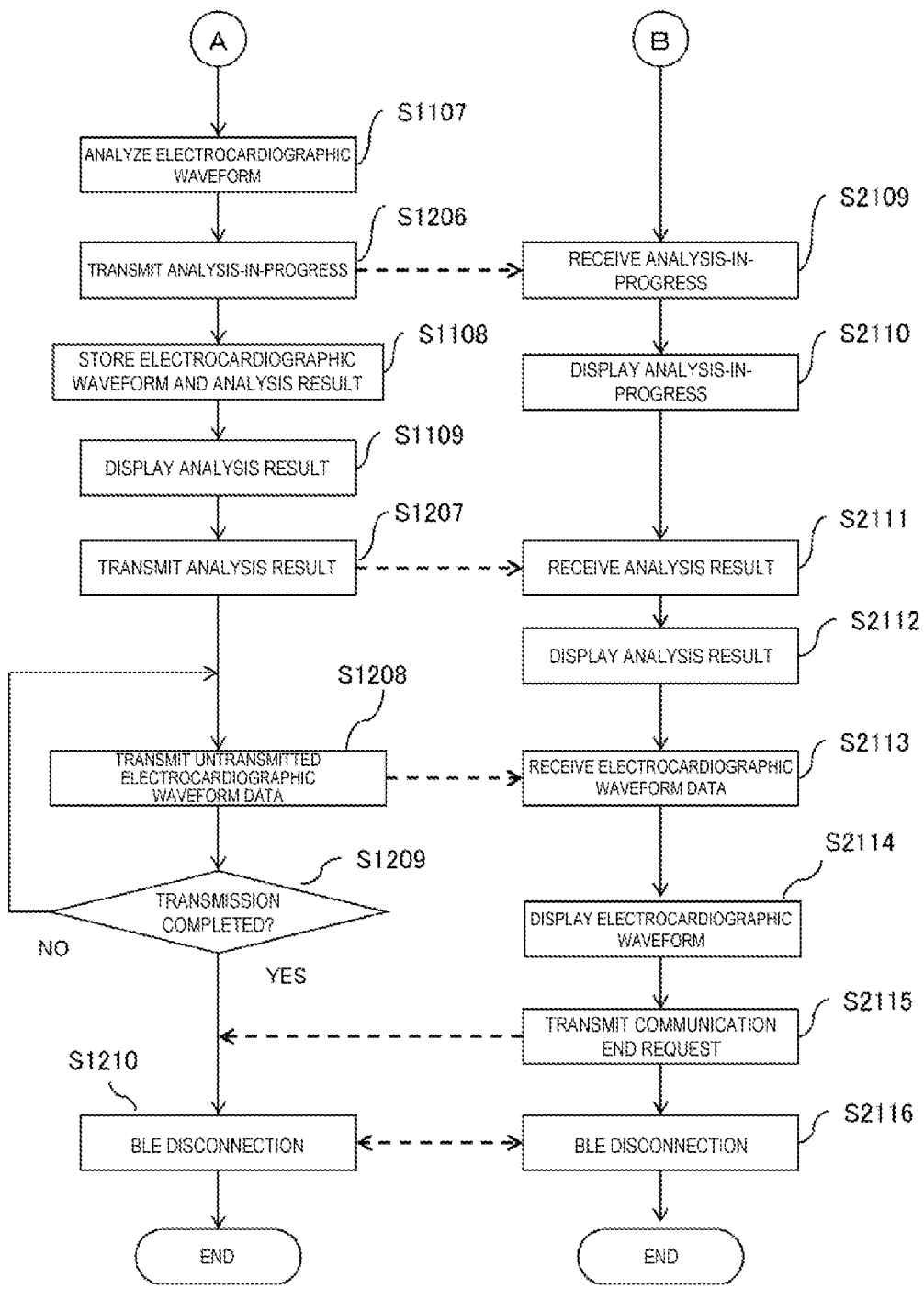
[FIG. 5]

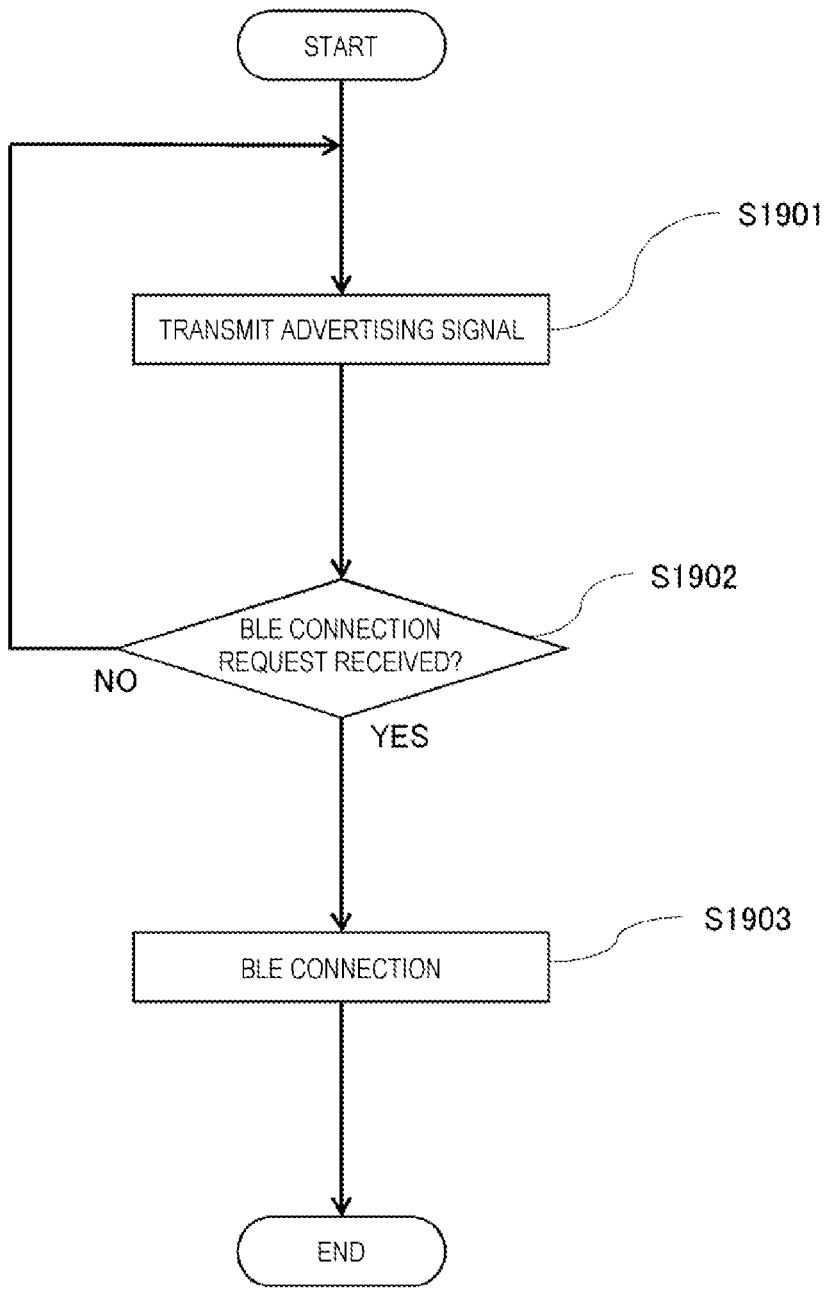

[FIG. 7(A)]
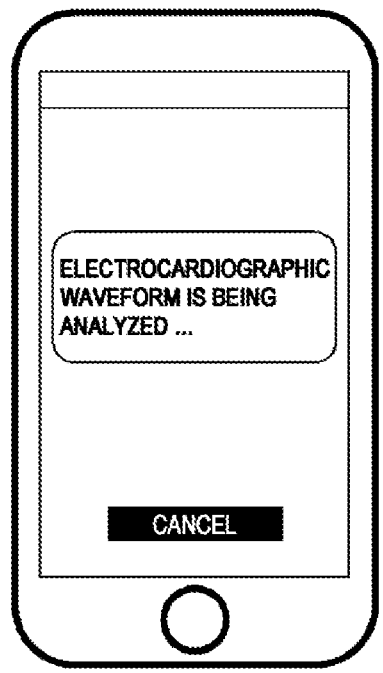

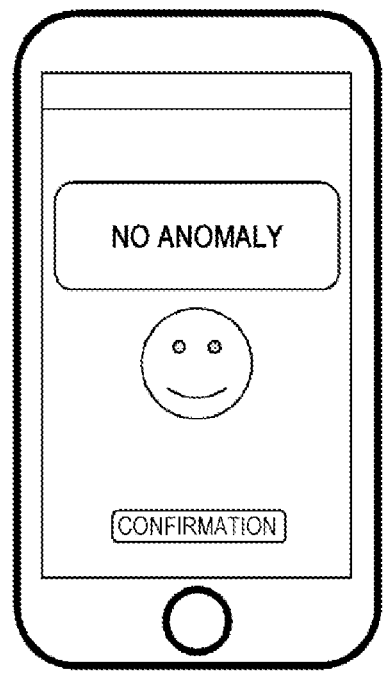
[FIG. 7(B)]

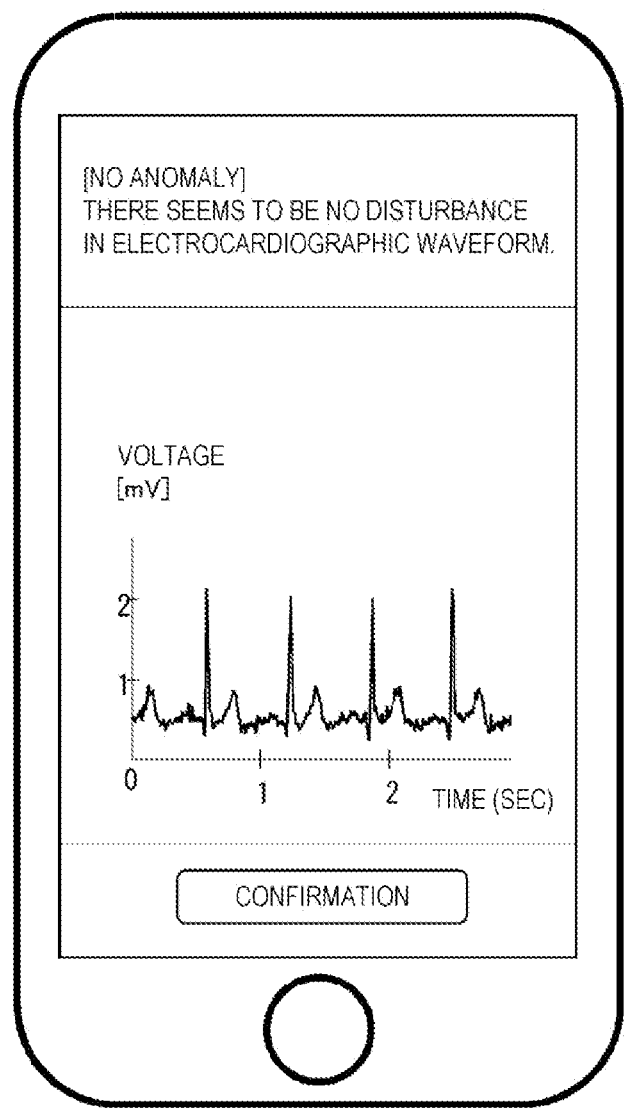

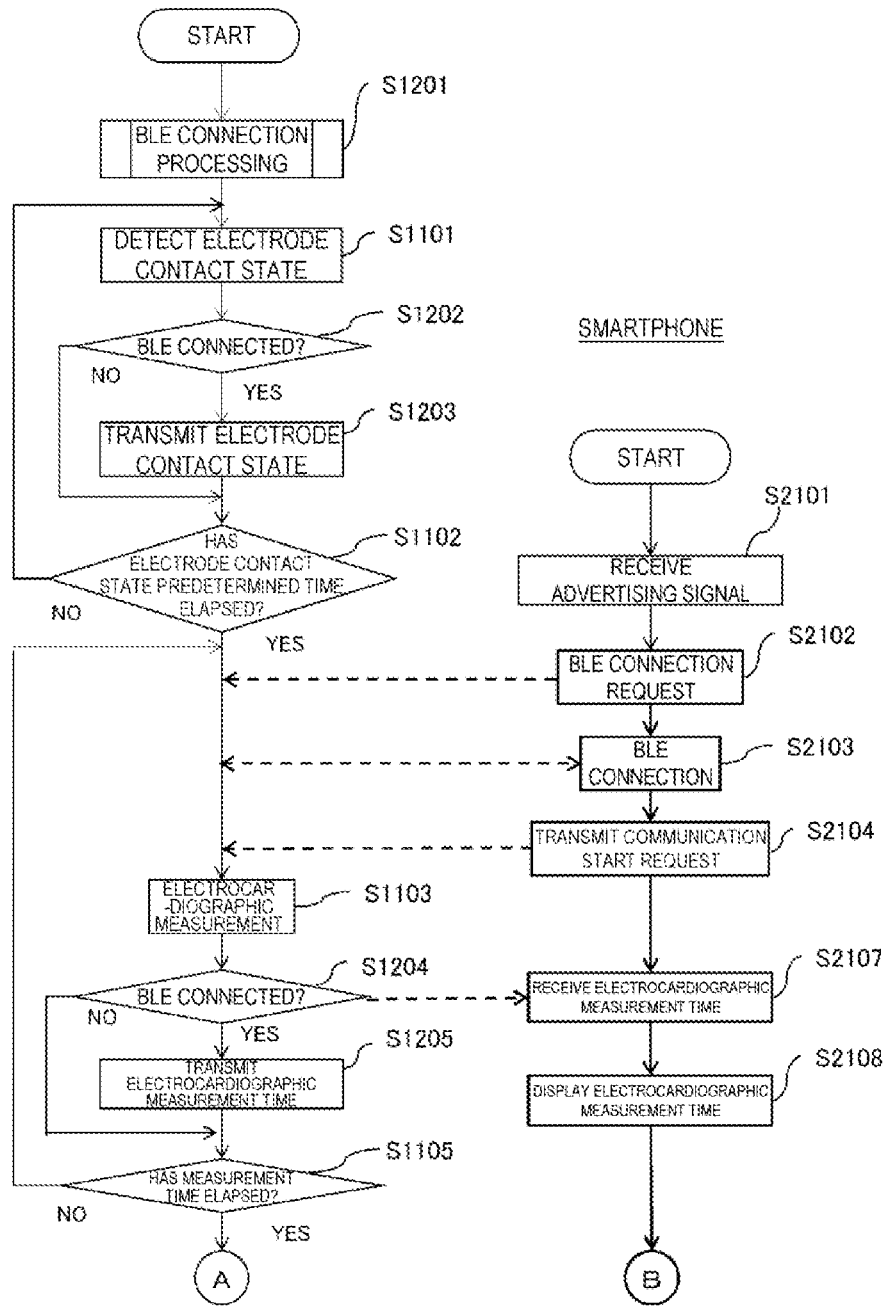

BIOLOGICAL INFORMATION MEASUREMENT DEVICE, BIOLOGICAL INFORMATION MANAGEMENT SYSTEM, AND CONTROL METHOD OF BIOLOGICAL INFORMATION MEASUREMENT DEVICE

CROSS-REFERENCE TO RELATED APPLICATIONS

This application is the U.S. national stage application filed pursuant to 35 U.S.C. 365(c) and 120 as a continuation of International Patent Application No. PCT/JP2020/041468, filed Nov. 6, 2020, which application claims priority to Japanese Patent Application No. 2019-209869, filed Nov. 20, 2019, which applications are incorporated herein by reference in their entireties.

TECHNICAL FIELD

The present invention belongs to the technical field related to healthcare, and particularly relates to a biological information measurement device, a biological information management system, and a control method of the biological information measurement device.

BACKGROUND ART

In recent years, it is becoming popular to perform health management by measuring information (hereinafter, also referred to as biological information) on the body and health of an individual such as a blood pressure value and an electrocardiographic waveform with a measurement device, and by recording and analyzing the measurement result with an information processing terminal.

As an example of a measurement device as described above, a portable electrocardiographic measurement device configured to measure an electrocardiographic waveform immediately when anomaly occurs in everyday life, such as pain and palpitation in a chest, has been proposed, and an early detection of heart disease or a contribution to appropriate treatment is expected (for example, Patent Documents 1 and 2). See Patent Citations:
Patent Document 1: JP 2005-000420 A; and, Patent Document 2: WO 2015/035251.

SUMMARY OF INVENTION

Technical Problem

Patent Document 1 describes a portable electrocardiographic measurement device that includes a sensor unit, a control unit, an input unit, a display unit, a timer unit, and performs measurement of an electrocardiographic waveform, display of during measurement, display of an analysis result, storage of the result, and the like, in the same main body. According to such a configuration, although it is possible to complete all processing such as measurement, display, and storage by the device alone, there is a problem that the device becomes large in size and is inconvenient to carry since all the configurations relating to these functions are provided.

On the other hand, Patent Document 2 discloses an electrocardiographic measurement device including a sensor unit, a control unit, a timer unit, and a transmission unit in a main body, transmitting measured electrocardiographic waveform data to a separate information processing terminal (including a smartphone and the like) by a wireless communication function such as ultrasonic waves, infrared rays, or Bluetooth (registered trademark), performing various displays by a display means of the terminal, and storing information on the information processing terminal side. According to this, since the measurement device itself does not include a display unit, the device can be miniaturized. However, according to the technique described in Patent Document 2, an electrocardiographic waveform is transmitted from the portable electrocardiographic device, and the start and end of measurement are determined and displayed by an application on the information processing terminal side. Therefore, there is a problem that even when the portable electrocardiographic device enters a measurable state, measurement by the electrocardiographic device cannot be performed until the communication with the information processing terminal is established and a measurement start instruction is executed via an application of the information processing terminal, which is inconvenient for a user.

In view of the above-described conventional techniques, an object of the present invention is to provide a technique in which a measurement process can be executed independently in a biological information measurement device, and the biological information measurement device can be used in communication connection with an information processing terminal regardless of the stage of the measurement process.

Solution to Problem

To solve the above problem, the biological information measurement device according to the present invention is a biological information measurement device including: a sensor capable of measuring biological information, a storage means that stores at least the biological information measured by the sensor, a communication means for communicating with another information processing terminal, and a control means that executes a measurement process of the biological information, wherein when the control means executes the measurement process of the biological information, in a case where communication between the biological information measurement device and the other information processing terminal is not established, the control means continuously executes a process for establishing a communication connection with the information processing terminal and executes a process of sequentially storing, in the storage means, the biological information that is measured, and in a case where the communication between the biological information measurement device and the other information processing terminal is established, the control means executes at least a process of transmitting, to the information processing terminal, status information that is information indicating a status of the measurement process of the biological information.

Here, the biological information is various types of information indicating biological activity, and examples thereof can include an electrocardiographic waveform, a body temperature, a pulse, and a blood pressure. According to such a configuration, the measurement of the biological information can be executed without waiting for the establishment of the communication with the information processing terminal, and when the communication with the information processing terminal is established, the information related to the measurement can be confirmed in the information processing terminal at any time after the establishment of the connection.

Further, the biological information measurement device may further include a time measurement means that measures at least a time until an end of measurement during execution of the measurement process of the biological information, wherein the status information transmitted to the other information processing terminal before the end of the measurement of the biological information may include the time until the end of the measurement of the biological information measured by the time measurement means.

According to such a configuration, it is possible to confirm the time until the end of the data measurement by the information processing terminal at the time of the measurement of the physical information which takes a long time for the measurement, and it is possible to suppress a sense of uneasiness, irritation, and the like caused by being unclear when the measurement is completed.

Further, the biological information measurement device may further include an analysis means that analyzes the biological information measured by the sensor, wherein the status information transmitted to the information processing terminal after measurement of the biological information is completed may include analysis related information related to analysis of the biological information by the analysis means.

Further, the analysis related information transmitted during execution of an analysis process by the analysis means may be information indicating that the analysis process is being executed, and the analysis related information transmitted after an end of the analysis process by the analysis means may be information indicating that the analysis of the biological information is completed.

Further, when the communication between the biological information measurement device and the other information processing terminal is established after an end of an analysis process by the analysis means, the control means may execute a process of transmitting, to the information processing terminal, analysis result information indicating a biological information analysis result by the analysis means.

According to such a configuration, unlike simply measuring biological information, the user can obtain analysis information of the measured data. Further, the user can confirm the status of the processing of the measurement device when the analysis process is performed in the information processing terminal, and it is possible to suppress a sense of uneasiness, and the like due to the behavior of the measurement device being unclear.

Further, the biological information measurement device may be a portable electrocardiographic measurement device, and the biological information may be an electrocardiographic waveform.

The biological information management system according to the present invention includes the biological information measurement device described above, and an information processing terminal configured to communicate with the biological information measurement device.

Further, the information processing terminal in the biological information management system may include an output means, the status information may be transmitted and received in a streaming manner, and when the information processing terminal receives the status information, the status information may be sequentially output from the output means.

According to such a configuration, by transmitting data of the relatively small data capacity to the information processing terminal in a streaming manner, it is possible to view the information in the information processing terminal in a timely manner.

Further, the information processing terminal in the biological information management system may be a smartphone.

Further, the control method of the biological information measurement device according to the present invention is a control method for a biological information measurement device capable of communicating with an information processing terminal, the method including: a connection step for executing a process for establishing a communication connection with the information processing terminal; a measuring step for measuring biological information regardless of success of failure of establishing the communication connection with the information processing terminal; and a storage step for sequentially storing the biological information measured in the measuring step, wherein when the connection step is completed by establishing the communication connection with the information processing terminal, a status information transmission step for transmitting status information to the information processing terminal is further executed, the status information being information indicating a measurement status of the biological information after the communication connection is established.

Further, in the measuring step, a time required to complete measurement of the biological information may be acquired, and the status information transmitted to the information processing terminal before an end of the measuring step may include information indicating the time required to complete the measurement of the biological information, the time being acquired in the measuring step.

Further, the control method of the biological information measurement device may further include an analysis step for analyzing the biological information stored in the storage step, wherein the status information transmitted to the information processing terminal after an end of the measuring step may include analysis related information related to analysis of the biological information in the analysis step.

Further, the analysis related information transmitted to the information processing terminal during a period from a start to an end of the analysis step may be information indicating that an analysis process is being executed, and the analysis related information transmitted to the information processing terminal after the end of the analysis step may be information indicating that the analysis of the biological information is completed.

Further, the present invention can also be understood as a program for causing an electrocardiographic measurement device to execute the above-described method, and a computer-readable recording medium in which such a program is non-temporarily recorded.

Also, each of the configurations and processes described above can be combined with each other to constitute the present invention unless a technical discrepancy occurs.

Advantageous Effects of Invention

According to the present invention, it is possible to provide a technique in which a measurement process can be executed independently in a biological information measurement device, and the biological information measurement device can be used in communication connection with an information processing terminal regardless of the stage of the measurement process.

BRIEF DESCRIPTION OF DRAWINGS

FIG. 1 is a diagram illustrating an outline of a biological information management system according to an embodiment.

(A) of FIG. 2 is a front view illustrating the configuration of the portable electrocardiographic measurement device according to the embodiment. (B) of FIG. 2 is a rear view illustrating the configuration of the portable electrocardiographic measurement device according to the embodiment. (C) of FIG. 2 is a left side view illustrating the configuration of the portable electrocardiographic measurement device according to the embodiment. (D) of FIG. 2 is a right side view illustrating the configuration of the portable electrocardiographic measurement device according to the embodiment. (E) of FIG. 2 is a plan view illustrating the configuration of the portable electrocardiographic measurement device according to the embodiment. (F) of FIG. 2 is a bottom view illustrating the configuration of the portable electrocardiographic measurement device according to the embodiment.

FIG. 3 is a flowchart illustrating a flow of electrocardiographic waveform measurement processing in the portable electrocardiographic measurement device according to the embodiment.

FIG. 4 is a flowchart illustrating a portion of a flow of a respective process in a case where a portable electrocardiograph and a smartphone are connected for communication in the biological information management system according to the embodiment.

FIG. 5 is a flowchart illustrating a portion of a flow of a respective process in a case where a portable electrocardiograph and a smartphone are connected for communication in the biological information management system according to the embodiment.

FIG. 6 is a flowchart illustrating a sub-routine of a process when a BLE communication is performed by the portable electrocardiographic measurement device according to the embodiment.

FIG. 7(A) is a diagram illustrating an example of a screen when electrocardiographic waveform analysis-in-progress display is performed on a smartphone according to the embodiment. FIG. 7(B) is a diagram illustrating an example of a screen when electrocardiographic waveform analysis result display is performed on the smartphone according to the embodiment.

FIG. 8 is a diagram illustrating an example of a screen when electrocardiographic waveform display is performed on the smartphone according to the embodiment.

FIG. 9 is a flowchart illustrating a portion of other examples of a process flow and in a case where a portable electrocardiograph and a smartphone are connected for communication in the biological information management system according to the embodiment.

DESCRIPTION OF EMBODIMENTS

First Embodiment

Embodiments of the present invention will be specifically described below with reference to the drawings. It should be noted that the dimension, material, shape, relative arrangement and the like of the components described in the present embodiment are not intended to limit the scope of this invention to them alone, unless otherwise stated.

System Configuration

FIG. 1 is a schematic diagram illustrating a configuration example of a biological information management system 1 according to the present embodiment. As illustrated in FIG. 1, the biological information management system 1 includes a portable electrocardiograph 10 as an example of a biological information measurement device and a smartphone 20 as an example of an information processing terminal, and these are configured to be capable of communication connection.

Electrocardiographic Measurement Device

FIG. 2 is a diagram illustrating a configuration of the portable electrocardiograph 10 according to the present embodiment. (A) of FIG. 2 is a front view illustrating a front surface of the main body, and similarly, (B) of FIG. 2 is a rear view, (C) of FIG. 2 is a left side view, (D) of FIG. 2 is a right side view, (E) of FIG. 2 is a plan view, and (F) of FIG. 2 is a bottom view.

On the bottom surface of the portable electrocardiograph 10, a left electrode 12a to be brought into contact with the left side of the body at the time of electrocardiographic measurement is provided. On the upper surface side of the opposite side surface, a first right electrode 12b to be brought into contact with the middle phalanx of the index finger of the right hand and a second right electrode 12c to be brought into contact with the base phalanx of the index finger of the right hand are similarly provided. Note that the first right electrode 12b is an electrode that functions as a GND electrode.

At the time of electrocardiographic measurement, the portable electrocardiograph 10 is held by the right hand, and the index finger of the right hand is placed at the upper surface portion of the portable electrocardiograph 10 so as to correctly contact the first right electrode 12b and the second right electrode 12c. The left electrode is then brought into contact with one of the skins corresponding to the desired measurement. For example, when measurement is performed by the so-called I lead, the left electrode is brought into contact with the palm of the left hand, and when measurement is performed by the so-called V4 lead, the left electrode is brought into contact with the skin slightly to the left of the epigastric region of the left chest and below the papilla.

In addition, various types of operation units and indicators are arranged at the left side surface of the portable electrocardiograph 10. Specifically, a power switch 16, a power source LED 16a, a Bluetooth (registered trademark) Low Energy (BLE) communication button 17, a BLE communication LED 17a, a memory residual display LED 18, a battery exchange LED 19, and the like, are provided.

Additionally, a measurement state notification LED 13, an analysis result notification LED 14, and the like are provided at the front surface of the portable electrocardiograph 10, and a battery housing opening and a battery cover 15 are arranged at the rear surface of the portable electrocardiograph 10.

Also, in FIG. 1, a block diagram illustrating a functional configuration of the portable electrocardiograph 10 is described. As illustrated in FIG. 1, the portable electrocardiograph 10 includes each functional unit of a control unit 101, such as an electrode unit 12, an amplifier unit 102, an analog to digital (AD) conversion unit 103, a timer unit 104, a storage unit 105, a display unit 106, an operation unit 107, a power source unit 108, a communication unit 109, and an analysis unit 110.

The control unit 101 is a means for controlling the portable electrocardiograph 10, and includes, for example, a central processing unit (CPU). Upon receiving the operation of the user via the operation unit 107, the control unit 101 controls each component of the portable electrocardiograph 10 to execute various processes such as electrocardiographic measurement, information communication, and the like according to a predetermined program. The predetermined program is stored in the storage unit 105, which will be described later, and is read therefrom.

The control unit 101 includes the analysis unit 110 configured to analyze the electrocardiographic waveform as a function module. The analysis unit 110 analyzes the presence or absence of the disturbance of the waveform and the like for the measured electrocardiographic waveform, and outputs at least a result indicating whether the electrocardiographic waveform at the time of measurement is normal.

The electrode unit 12 includes the left electrode 12a, the first right electrode 12b, and the second right electrode 12c, and functions as a sensor for detecting an electrocardiographic waveform. The amplifier unit 102 has a function of amplifying the signal output from the electrode unit 12. The AD conversion unit 103 converts the analog signal amplified by the amplifier 102 into a digital signal, and has a function to transmit it to the control unit 101.

The timer unit 104 has a function of measuring time with reference to the RTC (Real Time Clock). As will be described later, for example, the time until the end of measurement is counted at the time of electrocardiographic measurement, and is output.

The storage unit 105 includes a main storage device such as a random access memory (RAM), and stores various kinds of information such as an application program, a measured electrocardiographic waveform, and an analysis result. In addition to the RAM, for example, a long term storage medium such as flash memory may be provided.

The display unit 106 is configured to include the power source LED 16a, the BLE communication LED 17a, the memory residual display LED 18, the battery exchange LED 19, and the like described above, and transmits the state of the device to the user by turning on or blinking the LED. Furthermore, the operation unit 107 includes the power switch 16, the communication button 17, and the like, and receives input operation from a user, and has a function for causing the control unit 101 to execute a process in response to the operation.

The power source unit 108 is configured to include a battery that supplies the power required for operation of the device. The battery may be a secondary battery such as a lithium ion battery, for example, or may be a primary battery.

The communication unit 109 includes an antenna for wireless communication, and has a function of communicating with another device such as an information processing terminal described later by at least BLE communication. Alternatively, a terminal for communication by wired line may be provided.

Information Processing Terminal

As illustrated in FIG. 1, the smartphone 20, which is an example of the information processing terminal, includes a control unit 21, a communication unit 22, a touch panel display 23, and a storage unit 24. The control unit 21 is a means that manages control of the smartphone 20, and is configured to include, for example, a CPU and the like. The control unit 21 executes various programs stored in the storage unit 24 to exhibit functions corresponding to the programs. The communication unit 22 includes an antenna for wireless communication, and has a function of communicating with another device such as the portable electrocardiograph 10 and a wireless base station. Also, the terminal for wired communication may be provided.

The touch panel display 23 serves as both a display means as one of the output means and an input means, and can display status information such as a remaining time until the end of measurement, graph data of an electrocardiographic waveform, and the like, in a case where a communication connection with the portable electrocardiograph 10 is established, as described later. In addition, operations from the user are received via various input images.

The storage unit 24 is configured to include a long term storage medium such as a flash memory in addition to a main storage device such as a RAM, and stores various kinds of information such as an application program, a measured electrocardiographic waveform, and an analysis result.

Electrocardiographic Measurement Process Using Portable Electrocardiograph

Next, the operation of the portable electrocardiograph 10 when performing the electrocardiographic measurement is described on the basis of FIGS. 1, 2, and 3. FIG. 3 is a flowchart illustrating a procedure of processing when performing electrocardiographic measurement using the portable electrocardiograph 10.

Prior to measurement, the user operates the power switch 16 to turn ON the power source of the portable electrocardiograph 10. As a result, the power source LED is turned ON to indicate that the power source is ON. Then, the portable electrocardiograph 10 is held in the right hand, the index finger of the right hand is brought into contact with the 12b and the 12c, and the 12a is brought into contact with a portion of the skin to be measured. Then, the control unit 101 detects a contact state via the electrode unit 12 (S1101), and executes a process of determining whether a predetermined time has elapsed with the electrode correctly in contact (S1102). Here, if it is determined that the predetermined time has not elapsed, the control unit 101 repeats the same processing until the predetermined time elapses, and if it is determined that the predetermined time has elapsed, the process proceeds to step S1103, and actual electrocardiographic measurement is performed.

While the electrocardiographic measurement is performed, the control unit 101 stores the measurement value in the storage unit 105 at any time, and displays that the electrocardiographic measurement is being performed by blinking the measurement state notification LED 13 on the front surface of the main body at a predetermined rhythm (S1104).

Next, the control unit 101 executes a process of determining whether a predetermined measurement time of the electrocardiographic measurement has elapsed (for example, 30 seconds) (step S1105). Here, if it is determined that the predetermined amount of time has not elapsed, the process returns to step S1103, and the subsequent processing is repeated. On the other hand, if it is determined that the predetermined measurement time has elapsed, the measurement is completed, and a process of terminating the blink of the measurement state notification LED 13 is executed (step S1106).

Next, the analysis unit 110 of the control unit 101 performs analysis of the measured data (electrocardiographic waveform) stored in the storage unit 105 (S1107), and the analysis result is stored in a long term storage device along with the electrocardiographic waveform (S1108). Then, the control unit 101 displays the result of the analysis by the analysis result notification LED 14 (S1109), and ends the series of processes. Note that the analysis result may be displayed, for example, by turning on the LED only when there is an anomaly in the electrocardiographic waveform, or by turning on and blinking the LED according to the analysis result.

Cooperation with Information Processing Terminal

As described above, the portable electrocardiograph 10 can perform the electrocardiographic measurement, the analysis of the measurement data, and the display of the analysis result by itself. However, when the portable electrocardiograph 10 is used by being connected to the information processing terminal for communication, convenience can be further improved. Hereinafter, a case where the portable electrocardiograph 10 is used in communication connection with the smartphone 20 will be described with reference to FIGS. 4 to 9.

FIGS. 4 and 5 are diagrams illustrating the flow of processing and the timing of transmission of information between the devices when the portable electrocardiograph 10 and the smartphone 20 cooperate with each other by BLE communication to perform electrocardiographic measurement. Regarding the flow of processing of the portable electrocardiograph 10, those described above are denoted by the same reference numerals, and detailed description thereof will be omitted.

When the user operates the power switch 16 of the portable electrocardiograph 10 to turn ON the power source, a sub-routine process for BLE communication is executed in the portable electrocardiograph 10 (S1201).

FIG. 6 is a flowchart illustrating a flow of processing of the sub-routine. When the power source is turned ON, the control unit 101 of the portable electrocardiograph 10 transmits an advertising signal for BLE communication from the communication unit 109 (S1901). Next, the control unit 101 determines whether the connection request of the BLE communication is received from the other information processing terminal (S1902). Here, when determining that the connection request of the BLE communication is not received, similar processing is repeated until the BLE communication processing is canceled by the elapse of a predetermined time or operation of the operation unit 107. On the other hand, when determining that the connection request of the BLE communication is received, the process proceeds to step S1903, and the BLE connection with the device that transmits the connection request is performed. When the BLE communication connection is established, the control unit 101 ends the sub-routine. Note that the start trigger of the sub-routine is not limited to the power source ON, and may be, for example, by operation of the BLE communication button 17.

On the other hand, the user brings the smartphone 20 into a state in which the BLE communication with the portable electrocardiograph 10 is possible. Specifically, the touch panel display 23 is operated to make the BLE connection setting ON from the configuration menu and the like. Alternatively, the BLE connection setting may be turned ON by activating a dedicated application program for cooperation with the portable electrocardiograph 10.

When the BLE connection setting is ON, the control unit 21 of the smartphone 20 receives the advertisement signal for BLE communication via the communication unit 22 (S2101), and transmits the connection request for BLE to the portable electrocardiograph 10 (S2102). Then, the BLE connection is established with the portable electrocardiograph 10 (S2103, corresponding to S1903), and the communication start request is transmitted (S2104).

On the other hand, the control unit 101 of the portable electrocardiograph 10 detects the electrode contact state (S1101), and then executes a process of determining whether the BLE connection is established (S1202). If it is determined here that the BLE connection is established, the information related to the electrode contact state is transmitted toward the smartphone 20 (S1203), and the information is received in the smartphone 20 (S2105). Note that, if it is determined that no BLE connection is established in step S1202, the process skips step S1203 and proceeds to S1102 to execute a process of determining whether a predetermined time has elapsed in the electrode contact state.

In the smartphone 20 that has received the information on the electrode contact state, the electrode contact state is displayed on the touch panel display 23. For example, a message such as "the electrode is in proper contact" or "the electrode is not in proper contact" may be displayed.

On the other hand, the control unit 101 of the portable electrocardiograph 10 performs the electrocardiographic measurement in step S1103, and executes a process of determining whether the BLE connection is established (S1204). If it is determined here that the BLE connection is established, then a process of transmitting the electrocardiographic measurement time (remaining time until the end of the measurement) to the smartphone 20 is executed (S1205). If it is determined that no BLE connection is established, the process proceeds to step S1105, and executes a process of determining whether a predetermined measurement time has elapsed.

In step S1205, the electrocardiographic measurement time transmitted from the portable electrocardiograph 10 is received in the smartphone 20 (S2107), and the electrocardiographic measurement time is displayed on the touch panel display 23 (S2108). Specifically, for example, a countdown message such as "XX seconds until the end of electrocardiographic measurement" may be displayed.

The portable electrocardiograph 10 performs analysis of the electrocardiographic waveform in the analysis unit 110 (S1107), and transmits information indicating that the analysis is being performed if there is the smartphone 20 connected to the BLE during the execution of the analysis process (S1206). When the control unit 21 of the smartphone 20 receives the information indicating that the analysis is being performed via the communication unit 22 (S2109), the control unit 21 displays the information on the touch panel display 23 (S2110). FIG. 7(A) illustrates an example of a screen on which information indicating that analysis is being performed is displayed.

Furthermore, when the control unit 101 of the portable electrocardiograph 10 has completed the analysis of the electrocardiographic waveform, the control unit 101 stores the information (S1108) and displays the analysis result by turning on the LED (S1109), and executes a process of transmitting the analysis result, if there is the smartphone 20 connected to the BLE (S1207). Note that prior to the transmission of the analysis result, information indicating that the analysis processing has been completed may be transmitted.

When the transmitted analysis result is received via the communication unit 22 (S2111), the control unit 21 of the smartphone 20 causes the touch panel display 23 to display the result (S2112). FIG. 7(B) illustrates an example of a screen on which the analysis result is displayed. On the other hand, the control unit 101 of the portable electrocardiograph 10 transmits the electrocardiographic waveform data if there is the smartphone 20 connected to the BLE (S1208). Here, the control unit 21 of the smartphone 20 receives the electrocardiographic waveform data via the communication unit 22 in a background while continuing to display the analysis result on the touch panel display 23 (S2113). In this way, by displaying only the analysis result of the electrocardiographic waveform first during the transmission of the electrocardiographic waveform data having a large amount of information and requiring a long time for transmission and reception, it is possible to reduce the user's stress due to the waiting time until the completion of the transmission and reception. In step S1208, when there is an untransmitted analysis result in the storage unit 105, the analysis result may be transmitted together with the electrocardiographic waveform data.

When all of the electrocardiographic waveform data are received, the control unit 21 of the smartphone 20 displays the electrocardiographic waveform on the touch panel display 23 (S2114). FIG. 8 illustrates an example of a screen displayed in step S2114. Thereafter, a communication end request is transmitted to the portable electrocardiograph 10 via the communication unit 22 (S2115), the BLE connection is disconnected (S2116), and the processing on the smartphone 20 side is completed. Note that various kinds of information such as the analysis result and the electrocardiographic waveform data received by the smartphone 20 can be stored in the storage unit 24 and effectively used.

On the other hand, after step S1208, the control unit 101 of the portable electrocardiograph 10 executes a process of determining whether all of the electrocardiographic waveform data (and analysis results) have been transmitted (S1209). Here, if it is determined that there is an untransmitted electrocardiographic waveform data (and analysis result), then the process returns to step S1208, and the subsequent processing is repeated. On the other hand, if it is determined that all of the electrocardiographic waveform data (and analysis results) have been transmitted, the BLE connection is disconnected after waiting for the reception of the communication end request from the smartphone 20 (S1210), and the processing on the portable electrocardiograph 10 side is completed.

As described above, according to the portable electrocardiograph 10 and the biological information management system 1 described in the present embodiment, by being used in cooperation with the information processing terminal such as the smartphone 20, it is possible to display and browse various data such as electrocardiographic waveform data on the display. Furthermore, the received data can be stored, and can be effectively used using an application program and the like.

On the other hand, since the portable electrocardiograph 10 can measure and store the electrocardiographic waveform, analyze the electrocardiographic waveform data, and display and store the analysis result independently from the smartphone 20, it is possible to perform the electrocardiographic measurement at an arbitrary timing without waiting for establishment of communication with the smartphone 20.

In addition, even when the portable electrocardiograph 10 and the smartphone 20 are connected for communication, the communication does not need to be established from the stage of starting the measurement processing, and the communication connection with the smartphone 20 can be performed even in the middle of the measurement processing by the portable electrocardiograph 10. FIG. 9 is a flowchart illustrating a process when the BLE connection setting of the smartphone 20 is turned ON from the middle of the measurement process of the portable electrocardiograph 10. In FIG. 9, processes similar to those described above are denoted by the same reference numerals. As illustrated in FIG. 9, the smartphone 20 performs the BLE connection request after step S1102 of the portable electrocardiograph 10, and then establishes the BLE connection. Since the processing after the combiner in FIG. 9 is the same as the flow already described, the description thereof will be omitted.

As described above, according to the portable electrocardiograph 10 and the biological information management system 1 according to the present embodiment, the measurement of the biological information can be executed without waiting for the establishment of the communication with the information processing terminal, and when the communication with the information processing terminal is established, the information related to the measurement can be confirmed in the information processing terminal at any time after the establishment of the connection.

Note that in the embodiment described above, the status information such as the electrode contact state, the electrocardiographic measurement time, the analysis-in-progress screen information, and the analysis result information and the electrocardiographic waveform data may be transmitted and received by different transmission and reception methods. Specifically, status information having a relatively small data volume may be transmitted and received in a streaming manner, and electrocardiographic waveform data having a large data volume may be transmitted and received by high-speed data communication.

Other Points

The description of each example described above is merely illustrative of the present invention, and the present invention is not limited to the specific embodiments described above. Within the scope of the technical idea of the present invention, various modifications and combinations may be made.

For example, the measurement device may be other biological information measurement devices such as a sphygmomanometer, a body composition meter, a pulsimeter, and a thermometer, in addition to the portable electrocardiograph. That is, the biological information to be measured is not limited to the electrocardiographic waveform, and may be a blood pressure, a pulse, and the like. Note that while, in the example described above, the measurement device constituting the system is only the portable electrocardiograph, but the system may be configured to include a plurality of different measurement devices.

The information processing terminal is not limited to a smartphone, and may be another portable information processing terminal such as a tablet terminal, or may be a stationary terminal. Further, the communication unit is not limited to one for performing the BLE communication, and may be an antenna capable of performing other wireless communication such as Wi-Fi (registered trademark) or infrared communication. In addition, it may be a device that performs communication by wired connection.

REFERENCE NUMERALS LIST

1 Biological information management system
10 Portable electrocardiograph
13 Measurement state notification LED
14 Analysis result notification LED
15 Battery cover
16 Power switch
16a Power source LED
17 Communication button
17a BLE communication LED
18 Memory residual display LED
19 Battery exchange LED

The invention claimed is:
1. A biological information measurement device comprising:
a sensor capable of measuring biological information;
a storage unit that stores at least the biological information measured by the sensor;

a communication unit for communicating with another information processing terminal;
a control unit that executes a measurement process of the biological information in response to user operation; and,
an analysis unit that analyzes the biological information measured by the sensor, wherein:
when the control unit executes the measurement process of the biological information,
in a case where communication between the biological information measurement device and the other information processing terminal is not established, the control unit continuously executes a process for establishing a communication connection with the information processing terminal and executes a process of sequentially storing, in the storage unit, the biological information that is measured;
in a case where the communication between the biological information measurement device and the other information processing terminal is established, the control unit executes at least a process of transmitting, to the information processing terminal, status information that is information indicating a status of the measurement process of the biological information;
the status information transmitted to the information processing terminal after measurement of the biological information is completed comprises analysis related information related to analysis of the biological information by the analysis unit, when the communication between the biological information measurement device and the other information processing terminal is established after an end of an analysis process by the analysis unit, the control unit executes a process of transmitting, to the information processing terminal, analysis result information indicating: a biological information analysis result by the analysis unit; and, whether the biological information measured by the sensor is normal or abnormal; and,
wherein the analysis result information includes information indicating that biological information measured by the sensor is normal when it is normal.

2. The biological information measurement device according to claim 1, further comprising:

a timer unit that measures at least a time until an end of measurement during execution of the measurement process of the biological information, wherein
the status information transmitted to the other information processing terminal before the end of the measurement of the biological information comprises the time until the end of the measurement of the biological information measured by the timer unit.

3. The biological information measurement device according to claim 1, wherein
the analysis related information transmitted during execution of an analysis process by the analysis unit is information indicating that the analysis process is being executed, and
the analysis related information transmitted after an end of the analysis process by the analysis unit is information indicating that the analysis of the biological information is completed.

4. The biological information measurement device according to claim 1, wherein
the biological information measurement device is a portable electrocardiogra measurement device, and
the biological information is an electrocardiographic waveform.

5. An information management system comprising:
the biological information measurement device according to claim 1; and
an information processing terminal configured to communicate with the biological information measurement device.

6. The information management system according to claim 5, wherein
the information processing terminal comprises a display,
the status information is transmitted and received in a streaming manner, and
when the information processing terminal receives the status information, the status information is sequentially displayed on the display.

7. The information management system according to claim 5, wherein
the information processing terminal is a smartphone.

* * * * *